United States Patent
Suzuki et al.

(10) Patent No.: US 8,993,139 B2
(45) Date of Patent: Mar. 31, 2015

(54) SEALED SECONDARY BATTERY

(75) Inventors: Satoshi Suzuki, Toyota (JP); Katsumi Ito, Seto (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/318,820

(22) PCT Filed: Mar. 19, 2010

(86) PCT No.: PCT/JP2010/054830
§ 371 (c)(1),
(2), (4) Date: Nov. 4, 2011

(87) PCT Pub. No.: WO2010/131520
PCT Pub. Date: Nov. 18, 2010

(65) Prior Publication Data
US 2012/0052343 A1     Mar. 1, 2012

(30) Foreign Application Priority Data
May 15, 2009    (JP) .................................. 2009-119249

(51) Int. Cl.
*H01M 2/34*    (2006.01)
*H01M 2/02*    (2006.01)
(Continued)

(52) U.S. Cl.
CPC ............... *H01M 2/34* (2013.01); *H01M 2/023* (2013.01); *H01M 2/263* (2013.01); *H01M 2/345* (2013.01); *H01M 10/0431* (2013.01); *H01M 2/022* (2013.01)
USPC ............................................ 429/59; 429/57

(58) Field of Classification Search
CPC .......................... H01M 2/345; H01M 2200/20
See application file for complete search history.

(56) References Cited

U.S. PATENT DOCUMENTS 4,028,478 A * 6/1977 Tucholski ..................... 429/61
5,026,615 A * 6/1991 Tucholski ..................... 429/61
(Continued)

FOREIGN PATENT DOCUMENTS

JP    6-325796      11/1994
JP    2004-362956   12/2004
(Continued)

OTHER PUBLICATIONS

International Search Report in International Application No. PCT/JP2010/054830; Mailing Date: May 11, 2010.

*Primary Examiner* — Ula C Ruddock
*Assistant Examiner* — Scott J Chmielecki
(74) *Attorney, Agent, or Firm* — Finnegan, Henderson, Farabow, Garrett & Dunner, LLP (57) ABSTRACT

Disclosed is a sealed secondary battery provided with a current cut-off device which employs an inexpensive and uncomplicated construction, without the need to mount a separate current cut-off device on the battery body. A sealed secondary battery (10) comprises a battery casing (11) and a sealing plate (12), an electrode body (21) and current collecting plates (22, 22) provided on the inside of this casing (11). A contact section (11*c*) formed as part of the bottom (11*a*) of this battery casing (11) is bowed further inwards towards the negative electrode-side current collecting plate (22*b*) than the peripheral section of the bottom (11*a*) of this battery casing (11). At this contact section (11*c*), the inside face of the bottom (11*a*) of the battery casing contacts the current collecting plate (22*b*) at the negative electrode end, but this electrical contact between the contact section (11*c*) and the current collecting plate (22*b*) at the negative electrode end is cut off when outward swelling of the contact section (11*c*) takes place, produced by a rise in internal pressure in the casing in a sealed condition.

2 Claims, 6 Drawing Sheets

(51) Int. Cl.
*H01M 2/26* (2006.01)
*H01M 10/04* (2006.01)

(56) References Cited

U.S. PATENT DOCUMENTS 5,171,648 A * 12/1992 Beard ............................ 429/61
5,464,705 A    11/1995 Wainwright 2008/0182159 A1    7/2008 Mitani et al.
2010/0159308 A1 *  6/2010 Kim et al. ..................... 429/56

FOREIGN PATENT DOCUMENTS

| JP | 2006-99977  | 4/2006 |
| JP | 2007-87730  | 4/2007 |
| JP | 2007-227283 | 9/2007 |
| JP | 2008-130482 | 6/2008 |

* cited by examiner

| board thickness of battery casing (mm) | | concave amount H (mm) | Whether current is cut off by drop of internal pressure or not? | Whether connection is restored after rise of internal pressure or not? |
|---|---|---|---|---|
| side face T | bottom Tb | | | |
| 1.20 | 1.20 | 0.50 | ○ | × |
| | | 1.00 | × | × |
| | 1.00 | 0.50 | ○ | × |
| | | 1.00 | × | × |
| | 0.80 | 0.50 | ○ | × |
| | | 1.00 | ○ | ○ |
| | 0.70 | 0.50 | ○ | × |
| | | 1.00 | ○ | ○ |
| | 0.60 | 0.50 | ○ | × |
| | | 1.00 | ○ | ○ |

Results of overcharging test

SEALED SECONDARY BATTERY

CROSS-REFERENCE TO RELATED APPLICATIONS

This application is a national phase application of International Application No. PCT/JP2010/054830, filed Mar. 19, 2010, and claims the priority of Japanese Application No. 2009-119249, filed May 15, 2009, the contents of both of which are incorporated herein by reference.

TECHNICAL FIELD

The present invention relates to a sealed secondary battery. Concretely, the present invention relates to an art for constructing easily a current cut-off device formed in the sealed secondary battery so as to cut off a current.

BACKGROUND ART

Conventionally, a sealed secondary battery used widely for home electric appliances and the like. Especially, a lithium-ion secondary battery is actually used for an electric vehicle because of its high energy density.

When the secondary battery mentioned above is charged with electricity further than the state at which the battery is charged enough (full charge), overcharge occurs, whereby an internal short circuit may be caused between positive and negative electrodes so as to generate gas by resolution of an electrolyte. As a result, the internal pressure of the secondary battery rises, thereby causing exothermicity and failure of the secondary battery.

In the case in which such secondary batteries are employed as an assembled battery, by providing a control circuit in each of the batteries and watching the batteries totally, dispersion of capacities of the batteries and change of degradation speed can be tackled so as to prevent the overcharge. However, providing the control circuit in each of the batteries is difficult because it increases the cost and increases the weight and space.

On the other hand, as a countermeasure for the overcharge of the secondary battery, an art using a current cut-off device of so-called internal pressure reaction type is actually employed in which an electric connection section is disconnected when the internal pressure of the secondary battery becomes not less than a fixed value. Concretely, an art concerning the current cut-off device is well known in which an electrically conductive diaphragm (metal foil) is provided in a lid or a battery casing of the secondary battery, and when the internal pressure of the secondary battery reaches the reversal pressure of the diaphragm, the diaphragm is reversed oppositely to a current collecting plate, whereby the connection between the diaphragm and the current collecting plate is disconnected and the current is cut off (for example, see JP 2007-87730 A and JP 2007-227283 A).

PTL 1: JP 2007-87730 A
PTL 2: JP 2007-227283 A

SUMMARY OF INVENTION

Technical Problem

However, according to the conventional arts described in the Patent Literatures, in the current cut-off device, the battery body such as the lid or the battery casing and the electrically conductive diaphragm are separated from each other, that is, the diaphragm is attached separately from the battery body. Accordingly, the size of the battery is large considering the battery capacity, and the number of the parts and the design space are increased so as to increase the cost.

Then, the purpose of the present invention is to provide a sealed secondary battery provided with a current cut-off device which employs an inexpensive and uncomplicated construction so as to reduce the size of the battery and suppress the number of the parts and the design space.

Technical Solution

A sealed secondary battery according to a first embodiment of the present invention includes a cylindrical housing which has electrical conductivity and each of whose ends is formed therein with a bottom, an electrode body housed inside the housing and fixed inside the housing, and current collecting plates respectively disposed in both ends of the electrode body in the lengthwise direction inside the housing. A part of at least one of the bottoms of the housing is formed as a contact section contacting the current collecting plate and the contact section is electrically connected to the current collecting plate so as to make one of the bottom be a positive electrode and to make the other bottom be a negative electrode. The contact section is expanded outwards by a rise in internal pressure of the housing which is sealed so that the electric connection between the contact section and the current collecting plate is cut off.

Preferably, when the contact section is expanded outwards by the rise in the internal pressure of the housing and then the internal pressure of the housing drops, the state at which the electric connection between the contact section expanded outwards and the current collecting plate is cut off is maintained.

Preferably, the contact section is formed to be bowed towards the current collecting plate further than the peripheral section of the bottom of the housing, and the concave amount of the contact section from the peripheral section is larger than the board thickness of the part at which the contact section is formed.

Preferably, the housing comprises a battery casing having electrical conductivity and formed to be a close-end cylinder in which one of the ends thereof is opened, and a sealing plate having electrical conductivity and provided to the battery casing insulatedly so as to close the opening of the battery casing, and the contact section is formed in at least one of the sealing plate and the bottom of the battery casing so that one of the sealing plate and the bottom of the battery casing is made be a positive electrode and the other thereof is made be a negative electrode.

Preferably, the housing comprises a battery casing formed to be a cylinder in which both of the ends thereof are opened, and two sealing plates provided to the battery casing insulatedly so as to close the openings of the battery casing, and the contact section is formed in at least one of the sealing plates so that one of the sealing plates is made be a positive electrode and the other sealing plate is made be a negative electrode.

Preferably, the board thickness of the part of the bottom of the housing at which the contact section is formed is not more than the board thickness of the side face of the housing.

Advantageous Effect of the Invention

According to the present invention, in addition to using the housing as the positive and negative electrodes, the bottom of the housing is used as the diaphragm of the current cut-off device, whereby the sealed secondary battery provided with the current cut-off device which employs the inexpensive and uncomplicated construction in which it is not necessary to attach separately any current cut-off device to the battery body.

BRIEF DESCRIPTION OF DRAWINGS

FIG. 2(a) is an end view of the bottom of the sealed secondary battery according to a first embodiment at the normal state, and FIG. 2(b) is an end view of the bottom of the sealed secondary battery at the state at which internal pressure rises.

REFERENCE SIGNS LIST

10: sealed secondary battery
11: battery casing
11c: contact section
12: sealing plate
21: electrode body
22: current collecting plate

DESCRIPTION OF EMBODIMENTS

Next, explanation will be given on the mode for carrying out the present invention.

The technical field of the present invention is not limited to below embodiments and ranges widely to the entire range of technical idea, which the present invention means, defined by the matters described in the specification and the drawings.

[Sealed Secondary Battery 10 (First Embodiment)]

Figure 1:
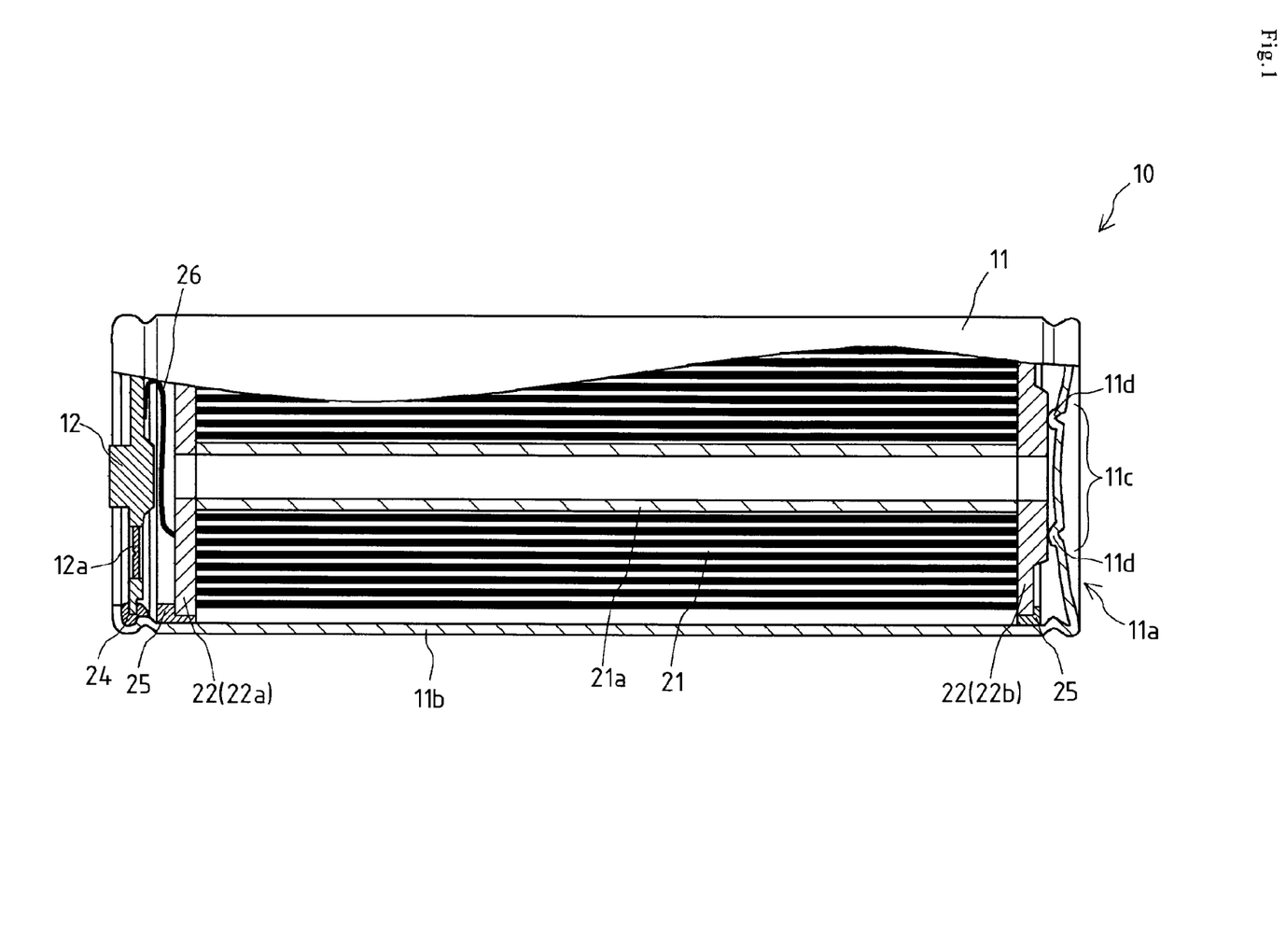
FIG. 1 is a drawing partially in section of entire construction of a sealed secondary battery according to a first embodiment.

Firstly, explanation will be given on a sealed secondary battery 10 according to a first embodiment of the present invention referring to FIG. 1. As shown in FIG. 1, the sealed secondary battery 10 has a battery casing 11 which is a cylindrical housing having electrical conductivity and a sealing plate 12.

The battery casing 11 is formed to be a close-end cylinder and one of the ends thereof is opened. The sealing plate 12 which is discal is disposed in the battery casing 11 via an insulator 24, whereby the sealing plate 12 closes the opening of the battery casing 11 while being insulated from the battery casing 11.

Accordingly, the housing is sealed by closing the opening of the battery casing 11 by the sealing plate 12. Namely, in this embodiment, the housing has two bottoms, i.e., a bottom 11a of the battery casing 11 opposite to the opening of the battery casing 11 and the sealing plate 12. The side face of the battery casing 11 forms a side face 11b of the battery casing 11.

Each of the battery casing 11 and the sealing plate 12 is formed by metal such as iron or aluminium and has electrical conductivity as mentioned above, but the material of each of the battery casing 11 and the sealing plate 12 is not limited. In this specification, the housing is supposed to be a circular cylinder. However, the housing may alternatively be a square cylinder, and the shale of the housing is not limited to the shape described in this specification.

A relief valve 12a is formed in the sealing plate 12 and opens when the pressure inside the sealed secondary battery 10 rises extremely, and discharges gas inside the sealed secondary battery 10 so as to secure the safety.

In the sealed secondary battery 10, an electrode body 21 formed to be a cylinder slightly smaller than the housing and two current collecting plates 22 respectively disposed at the ends of the electrode body 21 in the lengthwise direction are provided inside the housing.

While the current collecting plates 22 are disposed at the ends of the electrode body 21 and the current collecting plates 22 are surrounded by two insulation members 25 which are circular, the electrode body 21 is inserted into the battery casing 11 before closed its opening by the sealing plate 12.

Accordingly, the electrode body 21 and the current collecting plates 22 are fixed via the insulation members 25 to the battery casing 11, and then the sealing plate 12 closes the opening of the battery casing 11, whereby the electrode body 21 and the current collecting plates 22 are housed inside the battery casing 11.

The electrode body 21 is a wound body in which a positive electrode and a negative electrode are laminated via a separator formed by a porous body and then wound a plurality of times around an axial core 21a. Each of plied timbers respectively including a positive electrode active material and a negative electrode active material are held in corresponding one of the lamination sections of the positive electrode and the negative electrode. In other words, in the electrode body 21, a plied timber supporting section of the positive electrode and a plied timber supporting section of the negative electrode are laminated via the separator, and the electrode body 21 is charged and discharged by a chemical reaction between the positive electrode and the negative electrode in this lamination section.

The positive electrode is an electronic conductive collector foil (for example, a metal foil such as aluminum) wherein a part of surface of the foil is applied thereto with a plied timber including a positive electrode active material, and the negative electrode is an electronic conductive collector foil (for example, a metal foil such as copper) wherein a part of surface of the foil is applied thereto with a plied timber including a negative electrode active material.

The positive electrode is projected at one of the ends of the electrode body 21 in the lengthwise direction, and the negative electrode is projected at the other end. In this embodiment, in the electrode body 21, the positive electrode is projected at the end at the side of the sealing plate 12, and the negative electrode is projected at the end at the side of the bottom 11a. In the electrode body 21, a positive electrode-side current collecting plate 22a is disposed at the end at the side of the sealing plate 12, and a negative electrode-side current collecting plate 22b is disposed at the end at the side of the bottom 11a.

In the sealed secondary battery 10 constructed as mentioned above, the sealing plate 12 and the battery casing 11 are electrically connected respectively to the positive electrode-side current collecting plate 22a and the negative electrode-side current collecting plate 22b, whereby electric power generated by the electrode body 21 is taken out from the sealing plate 12 and the battery casing 11.

Concretely, a reed member 26 is welded to the inside face of the sealing plate 12 (the face of the sealing plate 12 at the side of the electrode body 21) and the reed member 26 is connected electrically to the positive electrode-side current collecting plate 22a, whereby the sealing plate 12 is connected electrically to the positive electrode-side current collecting plate 22a.

On the other hand, a contact section 11c formed as a part of the bottom 11a is bowed curvedly (dome-like) further inwards towards the negative electrode-side current collecting plate 22b than the peripheral section of the bottom 11a. At the contact section 11c, the inside face of the bottom 11a contacts and is connected electrically to the negative electrode-side current collecting plate 22b, whereby the battery casing 11 is connected electrically to the negative electrode-side current collecting plate 22b.

According to the construction, the sealing plate 12 serves as the positive electrode of the sealed secondary battery 10, and the bottom 11a serves as the negative electrode of the sealed secondary battery 10.

In this embodiment, for reducing the electric resistance at the contact section 11c, a plurality of projections 11d are formed in the contact section 11c and the projections 11d contact the negative electrode-side current collecting plate 22b, whereby the contact section 11c is electrically connected to the negative electrode-side current collecting plate 22b. Instead of forming the projections 11d in the contact section 11c, it may alternatively be constructed that the contact section 11c is formed flat and the contact section 11c contacts the negative electrode-side current collecting plate 22b.

In this embodiment, the contact section 11c is bowed curvedly further inwards than the peripheral section of the bottom 11a. However, for example, the contact section 11c may alternatively become hollow cylindrically further inwards than the peripheral section of the bottom 11a, and the shape of the contact section 11c is not limited.

[Current Cut-Off Device]

Figure 2:
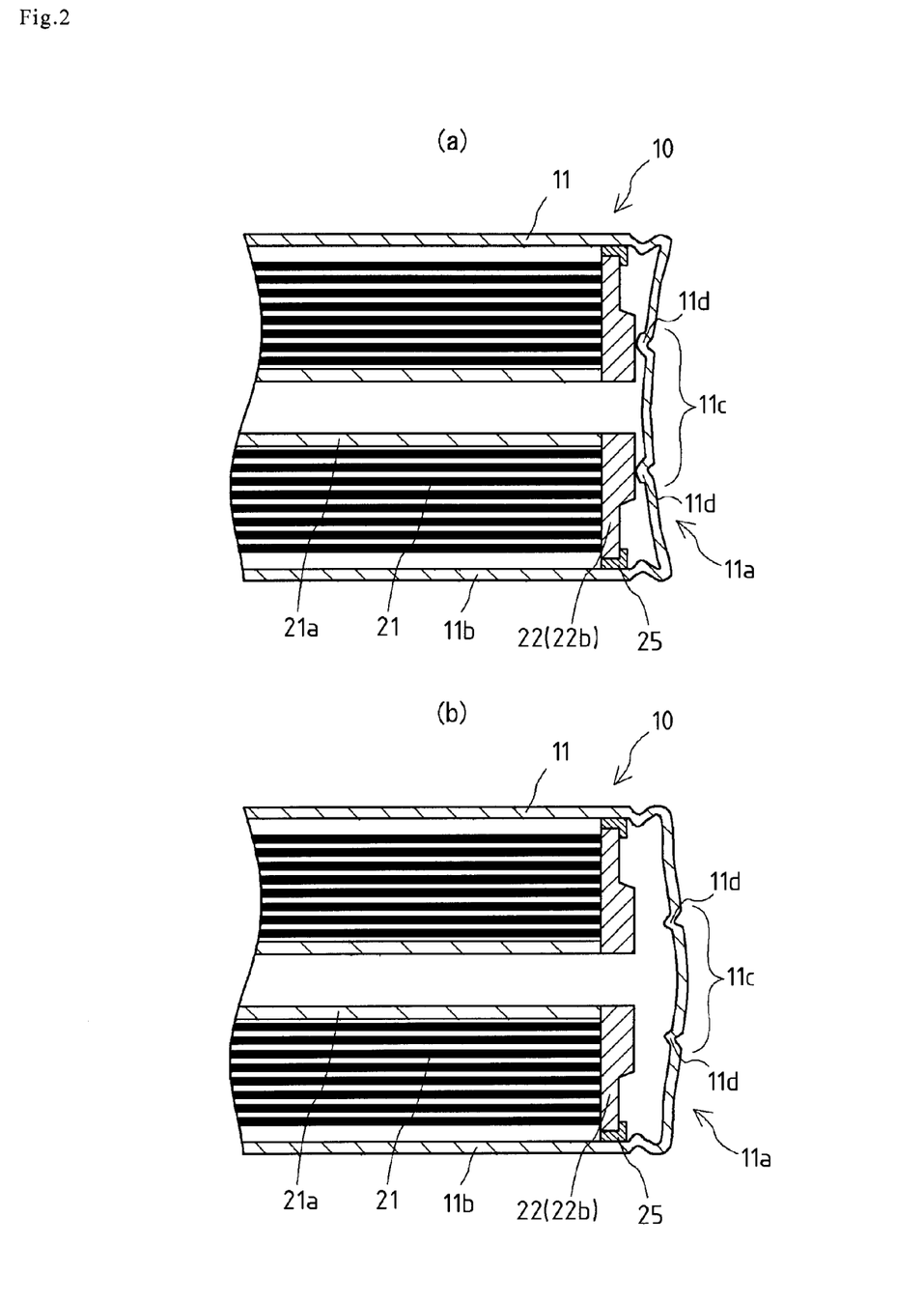
FIG. 2 is an end view of a bottom of a battery casing.

Next, explanation will be given on a current cut-off device of the sealed secondary battery 10 referring to FIGS. 2 and 3.

In the sealed secondary battery 10, when the internal pressure in the housing rises, the contact section 11c is expanded outwards, whereby the electric connection between the contact section 11c and the negative electrode-side current collecting plate 22b is cut off.

At the normal use, as shown in FIGS. 1 and 2(a), the contact section 11c contacts and is electrically joined to the negative electrode-side current collecting plate 22b, whereby the contact section 11c is electrically connected to the negative electrode-side current collecting plate 22b. However, when the sealed secondary battery 10 is overcharged and the overcharge causes an internal short circuit between the positive and negative electrodes so as to generate gas by resolution of an electrolyte, the internal pressure in the sealed secondary battery 10 becomes not less than a fixed value so that the contact section 11c is expanded outwards as shown in FIG. 2(b), whereby the electric connection is cut off.

In detail, when the internal pressure in the sealed secondary battery 10 reaches a reversal pressure of the bottom 11a by the gas, the contact section 11c is reversed oppositely to the negative electrode-side current collecting plate 22b and the joining between the contact section 11c and the negative electrode-side current collecting plate 22b is cut off, whereby the current is cut off. In other words, in the sealed secondary battery 10, the bottom 11a which is a part of the housing is constructed as a diaphragm so as to construct the current cut-off device.

As mentioned above, the battery casing 11 which is the main body of the battery and the bottom 11a which is the diaphragm integrally constitute the current cut-off device according to this embodiment. Namely, the bottom 11a which is the part of the main body of the battery serves as the diaphragm.

Accordingly, parts and a space for attaching a separate diaphragm which is necessary conventionally is not required, whereby the sealed secondary battery 10 can be downsized with an inexpensive and uncomplicated construction and the number of the parts and the design space can be prevented from being increased.

Figure 3:
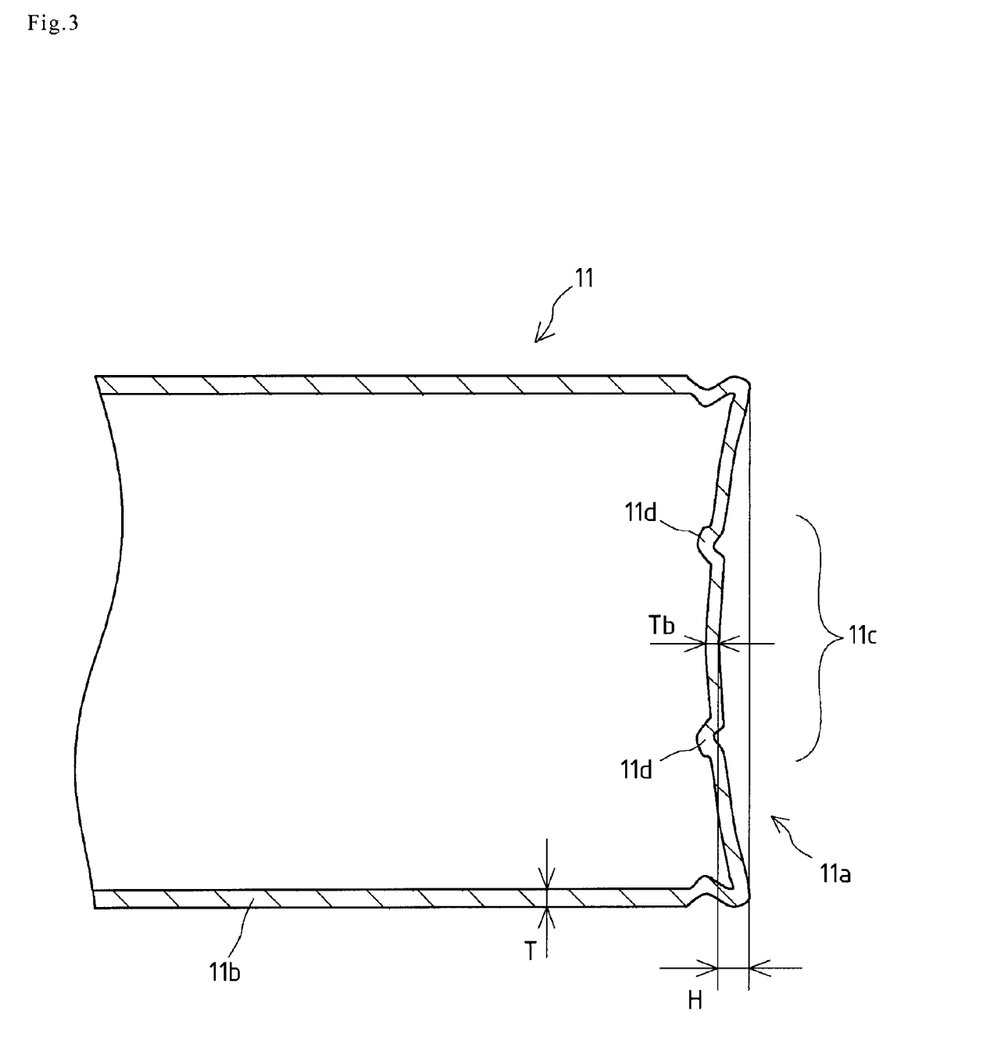
FIG. 3 is a sectional view showing the board thickness of the battery casing and a bowed amount of a contact section.

As shown in FIG. 3, preferably, a board thickness Tb of the part of the bottom 11a at which the contact section 11c is formed is not more than a board thickness T of the side face 11b of the housing.

According to the construction, the rigidity of the part at which the contact section 11c is formed is lower than the rigidity of the side face 11b of the housing.

Accordingly, when the internal pressure in the sealed secondary battery 10 rises, the contact section 11c can be reversed easily oppositely to the negative electrode-side current collecting plate 22b. Namely, when the state of emergency occurs which is the rise of the internal pressure in the sealed secondary battery 10 caused by the overcharging, the contact section 11c is reversed outwards while the side face 11b of the housing maintains its shape so that the current is cut off immediately, whereby problems such as exothermicity and failure of action can be prevented.

Furthermore, when the contact section 11c is expanded outwards by the rise of the internal pressure in the sealed secondary battery 10, the contact section 11c preferably maintains its expanded state even if the internal pressure of the housing drops subsequently so as not to contact electrically the negative electrode-side current collecting plate 22b again.

According to the construction, the operation of the current cut-off device can be made irreversible. Namely, the sealed secondary battery 10 in which the current cut-off device is operated and the current is cut off once is prevented from being reused.

Concretely, as shown in FIG. 3, a concave amount H of the contact section 11c in the peripheral section of the bottom 11a is larger than the board thickness Tb of the part of the bottom 11a at which the contact section 11c is formed.

According to the construction, the power required for reversing the contact section 11c is increased, whereby when the contact section 11c is expanded outwards once, the contact section 11c is not reversed inwards even if the internal pressure of the housing drops subsequently.

[Overcharge Test]

Next, explanation will be given on results of an overcharge test made by the inventor on the current cut-off device of the sealed secondary battery 10 according to this embodiment referring to FIG. 4.

The inventor made the overcharge test of the sealed secondary battery 10 while the board thickness T of the side face 11b of the battery casing 11 in the sealed secondary battery 10 was set be 1.2 mm, the board thickness Tb of the part of the bottom 11a at which the contact section 11c was set be 0.6 mm, 0.7 mm, 0.8 mm, 1.0 mm or 1.2 mm, and the concave amount H of the contact section 11c in the peripheral section of the bottom 11a was set be 0.5 mm or 1.0 mm.

Concretely, in the sealed secondary battery 10 under each of the conditions mentioned above, the internal pressure of the casing was raised by the overcharge test, and then it was checked whether the contact section 11c was expanded outwards and the electric connection between the contact section 11c and the negative electrode-side current collecting plate 22b was cut off or not. It was also checked whether the contact section 11c returned to the side of the negative electrode-side current collecting plate 22b and the electric connection therebetween was restored or not when the internal pressure of the casing drops after the rise in the internal pressure of the casing by the overcharge test.

Figure 4:
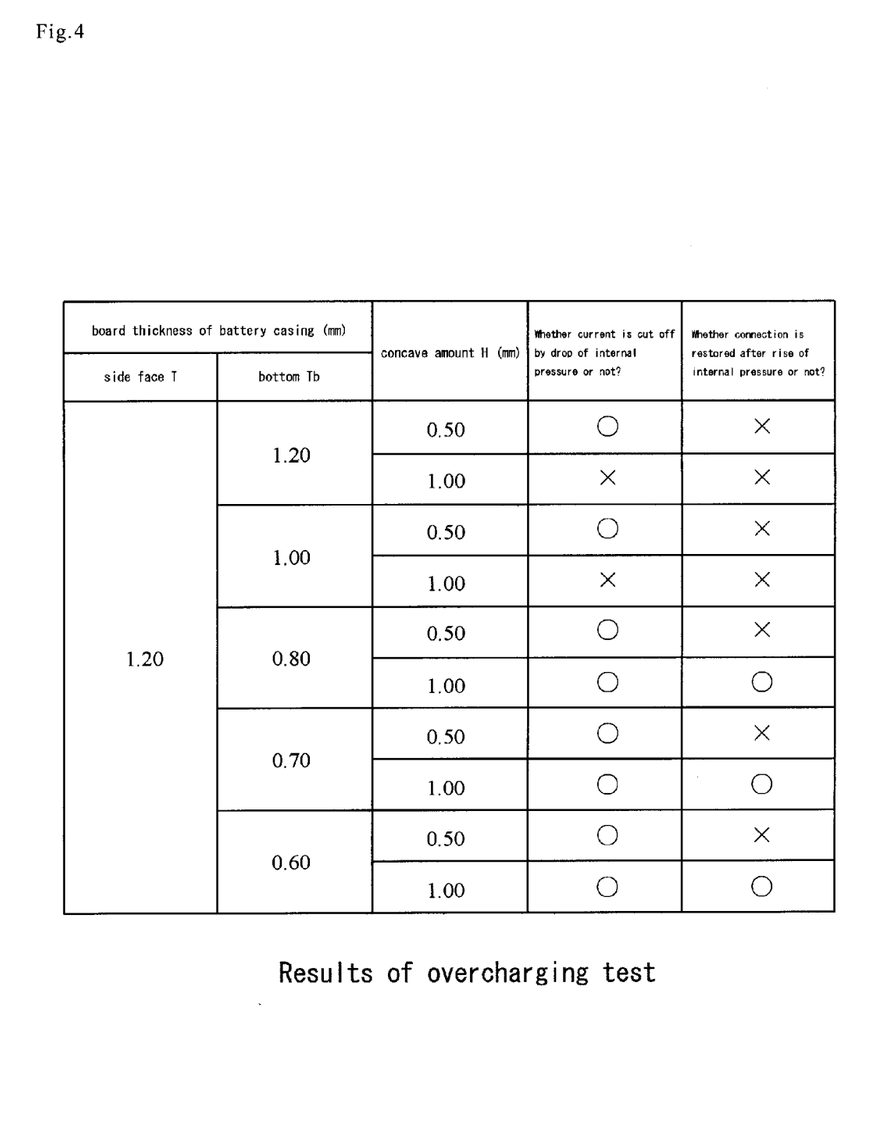
FIG. 4 is a diagram of results of an overcharge test of a current cut-off device.

The results of the overcharge test is shown in FIG. 4.

In FIG. 4, the case in which the current cut-off device operated normally and the current was cut off at the pressure not more than the internal pressure set by the inventor at the time at which the internal pressure of the casing rose (at the time of rise in the internal pressure) is indicated by ◯, and the case in which the current was not cut off at the internal pressure set by the inventor is indicated by X. The case in which the contact section 11c expanded outwards once was not reversed inwards again even if the internal pressure of the housing dropped subsequently (after the drop of the internal pressure) is indicated by ◯, and the case in which the contact section 11c was reversed inwards again is indicated by X.

As shown in FIG. 4, in the case in which the concave amount H of the contact section 11c in the peripheral section of the bottom 11a was set be 0.5 mm, when the board thickness Tb of the part at which the contact section 11c was not more than the board thickness T of the side face 11b of the battery casing 11, the effect of current cut-off was obtained in all the tests. In the case in which the concave amount H of the contact section 11c was set be 1.0 mm, when the board thickness Tb of the part at which the contact section 11c was 0.6 mm, 0.7 mm or 0.8 mm and was further smaller than the board thickness T of the side face 11b of the battery casing 11 which is 1.2 mm, the higher effect of current cut-off was obtained.

Therefore, according to the overcharge test made by the inventor, it is confirmed that by making the board thickness Tb of the part of the bottom 11a at which the contact section 11c not more than the board thickness T of the side face 11b of the housing, the contact section 11c can be reversed easily oppositely to the negative electrode-side current collecting plate 22b when the internal pressure in the sealed secondary battery 10 rises. Namely, it is confirmed that pertinent effect of current cut-off is obtained when the state of emergency occurs which is the rise of the internal pressure in the sealed secondary battery 10 caused by the overcharging.

On the other hand, as shown in FIG. 4, in the case in which the concave amount H of the contact section 11c in the peripheral section of the bottom 11a was made not more than the board thickness Tb of the part at which the contact section 11c, when the contact section 11c was expanded outwards once and subsequently the internal pressure of the housing drops, the contact section 11c was reversed inwards again. To the contrary, in the case in which the concave amount H was made more than the board thickness Tb, the contact section 11c expanded outwards once was not reversed inwards again even if the internal pressure of the housing drops subsequently.

Namely, according to the overcharge test made by the inventor, it is confirmed that by making the concave amount H more than the board thickness Tb, the contact section 11c expanded outwards once is prevented from being reversed inwards again even if the internal pressure of the housing drops subsequently.

[Sealed Secondary Battery 110 (Second Embodiment)]

Next, explanation will be given on a sealed secondary battery 110 according to a second embodiment of the present invention referring to FIG. 5. Explanation on the parts of the sealed secondary battery explained in the below embodiment which are in common with those in the embodiment mentioned above is omitted.

Figure 5:
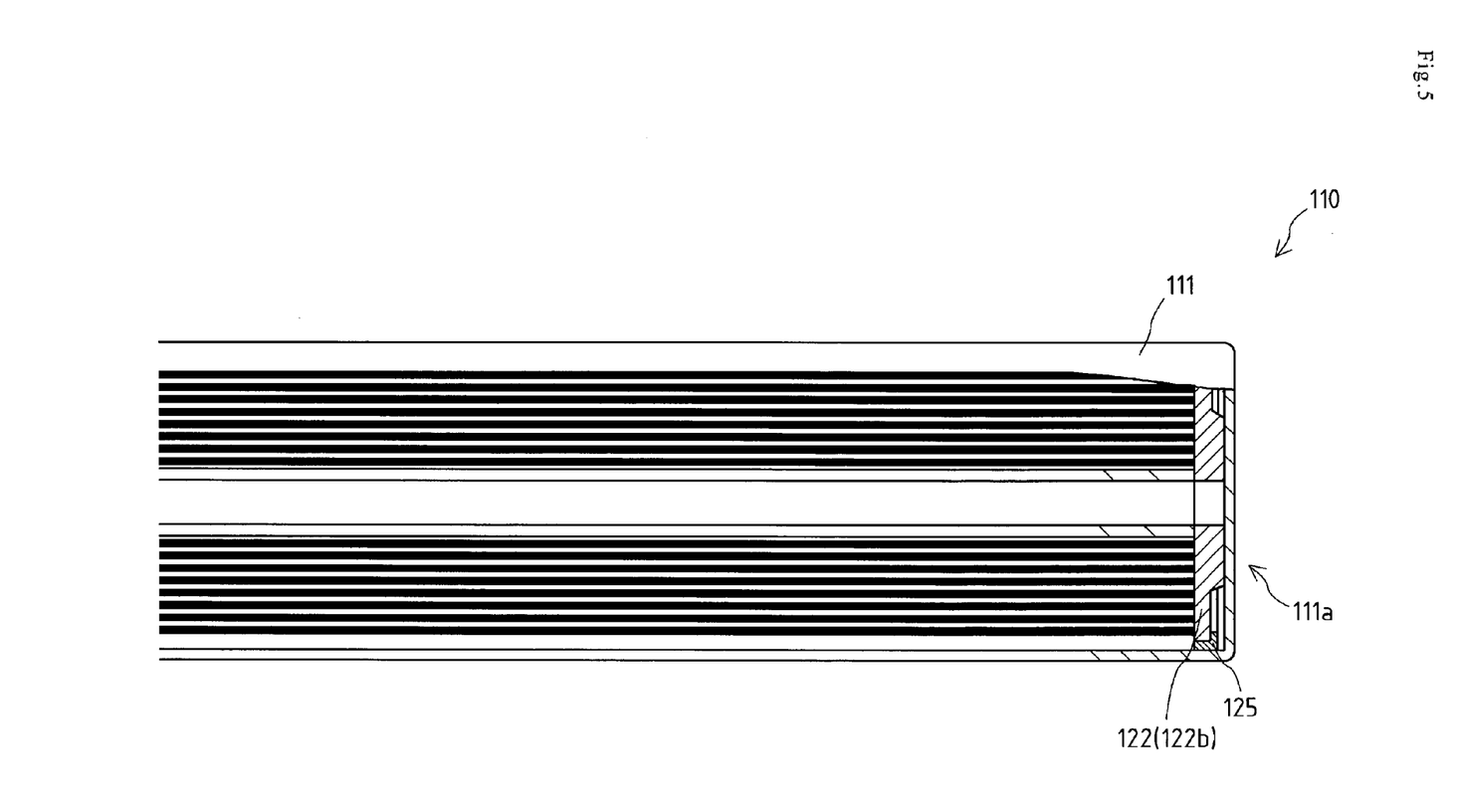
FIG. 5 is a drawing partially in section of entire construction of a sealed secondary battery according to a second embodiment.

As shown in FIG. 5, the sealed secondary battery 110 has a battery casing 111 which is a cylindrical housing having electrical conductivity and a sealing plate 112.

Similarly to the first embodiment, the battery casing 111 is formed to be a close-end cylinder and one of the ends thereof is opened. The sealing plate 112 which is discal is disposed in the battery casing 111 via an insulator 124, whereby the sealing plate 112 closes the opening of the battery casing 111 while being insulated from the battery casing 111.

In the sealed secondary battery 110, an electrode body 121 formed to be a cylinder slightly smaller than the housing and two current collecting plates 122 (a positive electrode-side current collecting plate 122a and a negative electrode-side current collecting plate 122b) respectively disposed at the ends of the electrode body 121 in the lengthwise direction are provided inside the housing. Namely, the electrode body 121 and the current collecting plates 122 are fixed via two insulation members 125 to the battery casing 111, and then the sealing plate 112 closes the opening of the battery casing 111.

In the sealed secondary battery 110 constructed as mentioned above, the sealing plate 112 and the battery casing 111 are electrically connected respectively to the positive electrode-side current collecting plate 122a and the negative electrode-side current collecting plate 122b, whereby electric power generated by the electrode body 121 is taken out from the sealing plate 112 and the battery casing 111.

Concretely, a contact section 112c is formed at a part of the sealing plate 112 so as to become hollow towards the positive electrode-side current collecting plate 122a further than the peripheral section of the sealing plate 112. At the contact section 112c, the inside face of the sealing plate 112 contacts and is electrically joined to the positive electrode-side current collecting plate 122a, whereby the sealing plate 112 is connected electrically to the positive electrode-side current collecting plate 122a.

On the other hand, a part of the inside face of the bottom 111a (the face at the side of the electrode body 121) contacts directly the negative electrode-side current collecting plate 122b, whereby the battery casing 111 is connected electrically to the negative electrode-side current collecting plate 122b.

According to the construction, the sealing plate 112 serves as the positive electrode of the sealed secondary battery 110, and the bottom 111a serves as the negative electrode of the sealed secondary battery 110.

In the sealed secondary battery 110 according to this embodiment, when the internal pressure in the housing rises, the contact section 112c is expanded outwards, whereby the electric connection between the contact section 112c and the positive electrode-side current collecting plate 122a is cut off.

Namely, when the internal pressure in the sealed secondary battery 110 reaches a reversal pressure of the sealing plate 112, the contact section 112c is reversed oppositely to the positive electrode-side current collecting plate 122a and the joining between the contact section 112c and the positive electrode-side current collecting plate 122a is cut off, whereby the current is cut off. In other words, in the sealed secondary battery 110 according to the present invention, the sealing plate 112 which is a part of the housing is constructed as a diaphragm so as to construct the current cut-off device.

As mentioned above, in the current cut-off device according to this embodiment, the sealing plate 112 which is a part of the main body of the battery serves as the diaphragm.

Accordingly, parts and a space for attaching a separate diaphragm which is necessary conventionally is not required, whereby the sealed secondary battery 110 can be downsized with an inexpensive and uncomplicated construction and the number of the parts and the design space can be prevented from being increased.

[Sealed Secondary Battery 210 (Third Embodiment)]

Figure 6:
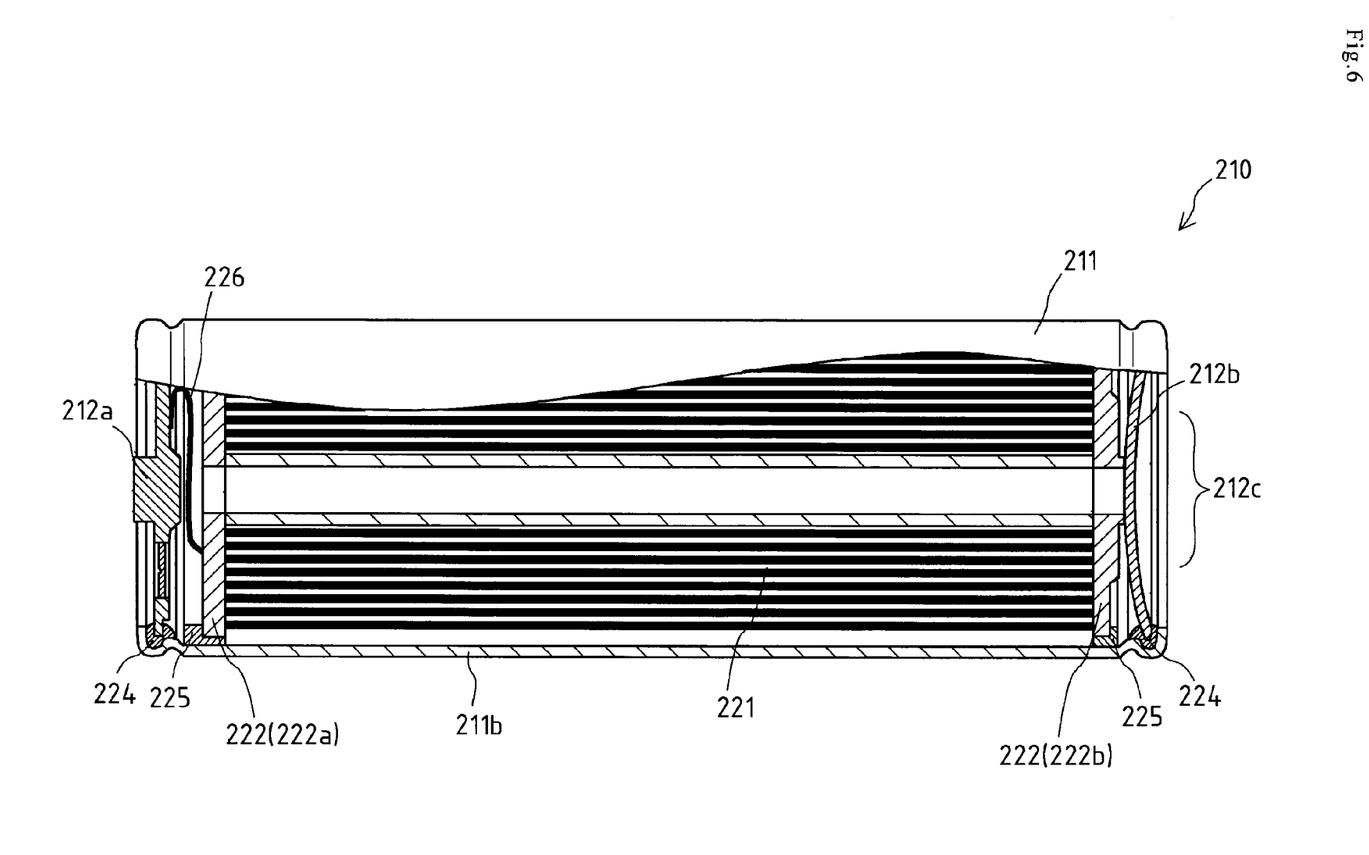
FIG. 6 is a drawing partially in section of entire construction of a sealed secondary battery according to a third embodiment.

Next, explanation will be given on a sealed secondary battery 210 according to a third embodiment of the present invention referring to FIG. 6. As shown in FIG. 6, the sealed secondary battery 210 has a battery casing 211 which is a cylindrical housing having electrical conductivity, and a positive electrode-side sealing plate 212a and a negative electrode-side sealing plate 212b.

The battery casing 211 is formed to be a cylinder and both ends thereof are opened. The positive electrode-side sealing plate 212a which is discal is arranged at the positive electrode side of the battery casing 211 via an insulator 224 at the insulated state, and the negative electrode-side sealing plate 212b is arranged at the negative electrode side of the battery casing 211 via an insulator 224 at the insulated state, whereby both of the openings of the battery casing 211 are closed by the positive electrode-side sealing plate 212a and the negative electrode-side sealing plate 212b.

In the sealed secondary battery 210, an electrode body 221 formed to be a cylinder slightly smaller than the housing and two current collecting plates 222 (a positive electrode-side current collecting plate 222a and a negative electrode-side current collecting plate 222b) respectively disposed at the ends of the electrode body 221 in the lengthwise direction are provided inside the housing. Namely, the electrode body 221 and the current collecting plates 222 are fixed via two insulation members 225 to the battery casing 211, and then both of the openings of the battery casing 211 are closed by the positive electrode-side sealing plate 212a and the negative electrode-side sealing plate 212b.

In the sealed secondary battery 210 constructed as mentioned above, the positive electrode-side sealing plate 212a and the negative electrode-side sealing plate 212b are electrically connected respectively to the positive electrode-side current collecting plate 222a and the negative electrode-side current collecting plate 222b, whereby electric power generated by the electrode body 221 is taken out from the positive electrode-side sealing plate 212a and the negative electrode-side sealing plate 212b.

Concretely, a reed member 226 is welded to the inside face of the positive electrode-side sealing plate 212a (the face of the positive electrode-side sealing plate 212a at the side of the electrode body 221) and the reed member 226 is connected electrically to the positive electrode-side current collecting plate 222a, whereby the positive electrode-side sealing plate 212a is connected electrically to the positive electrode-side current collecting plate 222a.

On the other hand, at a part of the negative electrode-side sealing plate 212b, a contact section 212c is formed so as to become hollow towards the negative electrode-side current collecting plate 222b further than the peripheral section of the negative electrode-side sealing plate 212b. At the contact section 212c, the inside face of the negative electrode-side sealing plate 212b contacts and is connected electrically to the negative electrode-side current collecting plate 222b, whereby the negative electrode-side sealing plate 212b is connected electrically to the negative electrode-side current collecting plate 222b.

According to the construction, the positive electrode-side sealing plate 212a serves as the positive electrode of the sealed secondary battery 210, and the negative electrode-side sealing plate 212b serves as the negative electrode of the sealed secondary battery 210.

In the sealed secondary battery 210 according to this embodiment, when the internal pressure in the housing rises, the contact section 212c is expanded outwards, whereby the electric connection between the contact section 212c and the negative electrode-side current collecting plate 222b is cut off.

Namely, when the internal pressure in the sealed secondary battery 210 reaches a reversal pressure of the negative electrode-side sealing plate 212b, the contact section 212c is reversed oppositely to the negative electrode-side current collecting plate 222b and the joining between the contact section 212c and the negative electrode-side current collecting plate 222b is cut off, whereby the current is cut off. In other words, in the sealed secondary battery 210, the negative electrode-side sealing plate 212b which is a part of the housing is constructed as a diaphragm so as to construct the current cut-off device.

As mentioned above, in the current cut-off device according to this embodiment, the negative electrode-side sealing plate 212b which is a part of the main body of the battery serves as the diaphragm.

Accordingly, parts and a space for attaching a separate diaphragm which is necessary conventionally is not required, whereby the sealed secondary battery 210 can be downsized with an inexpensive and uncomplicated construction and the number of the parts and the design space can be prevented from being increased.

In this specification, one of the bottoms of the housing as the contact section is electrically connected to the current collecting plate, and when the internal pressure in the housing rises, the contact section is expanded outward, whereby the electric connection between the contact section and the current collecting plate is cut off. However, the contact section may alternatively be formed in each of the bottoms of the housing. Namely, each of the bottoms may alternatively be constructed as the current cut-off device.

Industrial Applicability

The present invention can be employed for a sealed secondary battery having a current cut-off device therein, and is especially suitable for an art for constructing the current cut-off device easily.

The invention claimed is:

1. A sealed secondary battery consisting of:
 a cylindrical housing which has electrical conductivity and each of whose ends is formed therein with a bottom;
 an electrode body housed inside the housing and fixed inside the housing; and
 current collecting plates respectively disposed in both ends of the electrode body in the lengthwise direction inside the housing,
 wherein a part of at least one of the bottoms of the housing to be a negative electrode is formed as a contact section contacting the current collecting plate and the contact section is electrically connected to the current collecting plate so as to make that bottom of the housing be the negative electrode and to make the other bottom be a positive electrode,
 wherein the contact section is expanded outwards by a rise in internal pressure of the housing which is sealed so that the electric connection between the contact section and the current collecting plate is cut off,
 wherein the contact section is formed to be bowed towards the current collecting plate further than the peripheral section of the bottom of the housing, and the concave amount of the contact section from the peripheral section is larger than the board thickness of the part at which the contact section is formed, and wherein after the contact section is expanded outwards by the rise in the internal pressure of the housing, the state at which the electric connection between the contact section expanded outwards and the current collecting plate is cut off is maintained even if the internal pressure of the housing drops.

2. The sealed secondary battery according to claim 1, wherein the board thickness of the part of the bottom of the housing at which the contact section is formed is not more than the board thickness of the side face of the housing.

\* \* \* \* \*

UNITED STATES PATENT AND TRADEMARK OFFICE
CERTIFICATE OF CORRECTION

Page 1 of 2

PATENT NO. : 8,993,139 B2
APPLICATION NO. : 13/318820
DATED : March 31, 2015
INVENTOR(S) : Suzuki et al.

It is certified that error appears in the above-identified patent and that said Letters Patent is hereby corrected as shown below:

Please replace Fig. 5 with Fig. 5 shown on the following page Signed and Sealed this
First Day of December, 2015

Michelle K. Lee
*Director of the United States Patent and Trademark Office*

Fig.5